United States Patent
Kashima et al.

(10) Patent No.: US 9,120,615 B2
(45) Date of Patent: Sep. 1, 2015

(54) STORAGE DEVICE FOR GRANULAR MATERIAL

(75) Inventors: Makoto Kashima, Ichihara (JP);
Hajime Takasugi, Shunan (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 14/116,012

(22) PCT Filed: May 31, 2012

(86) PCT No.: PCT/JP2012/064052
§ 371 (c)(1),
(2), (4) Date: Nov. 6, 2013

(87) PCT Pub. No.: WO2012/165534
PCT Pub. Date: Dec. 6, 2012

(65) Prior Publication Data
US 2014/0093340 A1    Apr. 3, 2014

(30) Foreign Application Priority Data
Jun. 1, 2011 (JP) ................. 2011-123665

(51) Int. Cl.
*B65G 11/00* (2006.01)
*B65D 88/54* (2006.01)
(Continued)

(52) U.S. Cl.
CPC .......... *B65D 88/54* (2013.01); *B65D 88/26* (2013.01); *B65G 11/088* (2013.01); *B65G 11/206* (2013.01); *B65G 47/72* (2013.01); *B65G 69/16* (2013.01)

(58) Field of Classification Search
CPC .... B65G 69/16; B65G 11/088; B65G 11/083; B65G 11/085; B65G 11/206; B65G 47/72; B65D 88/26; B65D 88/54
USPC ............................................. 414/293; 193/27
See application file for complete search history.

(56) References Cited

U.S. PATENT DOCUMENTS

| 248,912 | A | * | 11/1881 | Campbell | ........................ 432/99 |
| 260,104 | A | * | 6/1882 | Lidford | ............................ 193/27 |

(Continued)

FOREIGN PATENT DOCUMENTS

| CN | 1199742 A | 11/1998 |
| CN | 1726231 A | 1/2006 |

(Continued)

OTHER PUBLICATIONS

U.S. Appl. No. 14/116,035, filed Nov. 6, 2013, Takasugi, et al.

(Continued)

*Primary Examiner* — Saul Rodriguez
*Assistant Examiner* — Mark Hageman
(74) *Attorney, Agent, or Firm* — Oblon, McClelland, Maier & Neustadt, L.L.P.

(57) ABSTRACT

A groove inclined path for diagonally downwardly delivering hydrogenated petroleum resin pellets loaded through a loading port is provided in a storage hopper for storing the hydrogenated petroleum resin pellets. The groove inclined path is defined by a plurality of groove-inclined-path members each having an inclined plate and side plates to define a groove structure, the groove-inclined-path members being vertically disposed so that flow directions of the hydrogenated petroleum resin pellets become opposite. The vertically adjacent ones of the groove-inclined-path members are disposed so that the hydrogenated petroleum resin pellets dropped from upper one of the groove-inclined-path members are brought into contact with the plate member of immediately lower one of the groove-inclined-path members to reverse a flow direction thereof, thereby reducing a flow speed of the hydrogenated petroleum resin pellets.

6 Claims, 10 Drawing Sheets

(51) Int. Cl.
    *B65G 11/08*      (2006.01)
    *B65D 88/26*      (2006.01)
    *B65G 69/16*      (2006.01)
    *B65G 47/72*      (2006.01)
    *B65G 11/20*      (2006.01)

(56) References Cited

U.S. PATENT DOCUMENTS

| | | | | |
|---|---|---|---|---|
| 3,926,290 | A | * | 12/1975 | Isojima et al. ............ 193/27 |
| 4,938,372 | A | * | 7/1990 | Morimoto et al. ............ 220/501 |
| 2006/0021670 | A1 | * | 2/2006 | Baber ............ 141/2 |
| 2007/0228078 | A1 | * | 10/2007 | Sanders ............ 222/146.1 |

FOREIGN PATENT DOCUMENTS

| | | |
|---|---|---|
| CN | 101220124 A | 7/2008 |
| FR | 1 405 937 | 7/1965 |
| GB | 403 146 | 12/1933 |
| JP | 50 152470 | 12/1975 |
| JP | 51 085479 | 7/1976 |
| JP | 53 54579 | 5/1978 |
| JP | 60 107041 | 7/1985 |
| JP | 4 2234 | 1/1992 |
| JP | 3113554 | 8/2005 |
| JP | 2010 179923 | 8/2010 |
| WO | 2010 032560 | 3/2010 |

OTHER PUBLICATIONS

U.S. Appl. No. 14/115,962, filed Nov. 6, 2013, Iwata, et al.
Office Action issued on Jan. 7, 2015, in the corresponding Chinese Patent Application No. 201280022300.9 (with English Translation and Translation of Category of Cited Documents).
International Search Report Issued Aug. 21, 2012 in PCT/JP12/64052 Filed May 31, 2012.

\* cited by examiner

STORAGE DEVICE FOR GRANULAR MATERIAL

CROSS REFERENCE TO RELATED APPLICATIONS

The present application is a 35 U.S.C. §371 national stage patent application of International patent application PCT/JP2012/064052, filed on May 31, 2012, published as WO/2012/165534 on Dec. 6, 2012, the text of which is incorporated by reference, and claims the benefit of the filing date of Japanese application no. 2011-123665, filed on Jun. 1, 2011, the text of which is also incorporated by reference.

TECHNICAL FIELD

The present invention relates to a storage device for storing a granular material.

BACKGROUND ART

Some of typically known storage devices such as a silo and a hopper include a device for reducing a pressure applied on an object to be stored that is easily broken (see, for instance, Patent Literatures 1 and 2).

In Patent Literature 1, a spiral partition wall is disposed at the center of a silo body. Objects to be stored fall on the spiral partition plate, so that falling energy is reduced and the pressure acting between the to-be-stored objects is decreased to prevent aggregation and cross-linking of the objects.

Patent Literature 2 discloses: a spiral chute provided in a material tank for transferring the material from an upper side to a lower side; and a speed restraining device provided in the transfer path of the spiral chute, the speed restraining device being adapted to pivotally move in a transfer direction.

CITATION LIST

Patent Literature(s)

Patent Literature 1 JP-A-53-54579
Patent Literature 2 JP-A-50-152470

SUMMARY OF THE INVENTION

Problem(s) to be Solved by the Invention

However, according to the arrangement including the spiral partition plate disclosed in Patent Literature 1, the objects to be stored may be accumulated on the spiral partition plate at a gentle slope (i.e. a slope with a small inclination) and consequently may be clogged on the way. In contrast, with a steep slope (i.e. a slope with a high inclination), the fall speed of the objects gradually increases, whereby an impact applied on the objects increases to damage the objects to be stored or cause aggregation or cross-linking of the objects.

According to the arrangement including the spiral chute having the speed restraining device, the mechanism for effecting the pivotal movement of the speed restraining device may result in a complicated structure and troublesome production and maintenance process. In addition, the objects to be stored are likely to be accumulated on a spiral partition plate at a gentle slope (i.e. with a small inclination) of the spiral chute. Especially, relatively light objects (e.g. grain and resin pellets) are likely to be accumulated at the speed restraining device. Accordingly, the accumulated objects to be stored may overflow from the spiral chute and the objects may be broken due to the impact when being dropped. Further, when the amount of the objects to be stored increases, the objects are accumulated on the spiral chute to keep the transfer path open even at the position of the speed restraining device. Thus, since the objects to be stored are clogged between the speed restraining device and the spiral chute, the speed restraining device is unable to reclose the transfer path again even when the objects are discharged, thereby impairing the speed restraining function of the device.

An object of the invention is to provide a storage device capable of favorably storing a granular material without causing damage thereon.

Means for Solving the Problem(s)

A storage device of a granular material according to an aspect of the invention includes: a loading port provided at an upper part of the storage device; a discharge port provided at a lower part of the storage device; a flow path that diagonally downwardly delivers the granular material loaded through the loading port, the flow path restraining a breakage on the granular material; and a deceleration unit provided to the flow path, the deceleration unit reversing a direction for the granular material to be delivered to reduce a flow speed of the granular material.

According to the above aspect of the invention, while the granular material loaded through the loading port flows diagonally downward, the flow direction of the granular material is changed by the deceleration unit to reduce the flow speed thereof.

Accordingly, the impact applied when the granular material loaded through the loading port is dropped downward is reduced, so that the breakage of the granular material can be avoided.

In the above aspect of the invention, the flow path preferably includes a groove-structure defining member for delivering the granular material diagonally downward.

According to the above arrangement, with a simply structured member that defines a groove structure, the granular material can be delivered diagonally downward. Further, when the loaded granular material is gradually piled up to the groove-structure defining member, the granular material overflows the groove-structure defining member to go around to a lower side of the groove-structure defining member. Accordingly, the granular material is kept from being clogged on the way and a dead space (i.e. a space in which the granular material cannot be stored) is not generated, thereby achieving efficient storing of the granular material.

In the above aspect of the invention, the groove-structure defining member preferably includes a plurality of groove-structure defining members that are vertically disposed, vertically adjacent ones of the groove-structure defining members on which the granular material flows are preferably inclined in opposite directions, and the deceleration unit is preferably provided in a course provided by the vertically adjacent groove-structure defining members According to the above arrangement, when the granular material flows diagonally downward on the plurality of groove-structure defining members disposed so that flow directions of the granular material become opposite, the flow direction of the granular material is changed by the deceleration unit disposed between the vertically adjacent ones of the groove-structure defining members. The granular material of which flow speed is reduced by the reverse movement flows diagonally downward in an opposite direction on the immediately lower one of the groove-structure defining members.

Accordingly, the granular material can be stored with a simple structure without being broken.

In the above aspect of the invention, the deceleration unit is preferably a plate member with which the granular material dropped down from a lower part of each of the groove-structure defining members is brought into contact.

According to the above arrangement, the flow direction of the granular material flowing diagonally downward on the groove-structure defining members can be reversed by contacting and bouncing the granular material on the simply-structured plate member. Accordingly, the flow speed can be easily reduced by reversing the flow direction, whereby the breakage on the granular material can be restrained with a simple structure.

In the above aspect of the invention, a groove width of each of the groove-structure defining members for delivering the granular material is preferably wider at an upper part of each of the groove-structure defining members than the lower part of each of the groove-structure defining members.

According to the above arrangement, the granular material that is dropped from the lower part of the groove-structure defining member to be in contact with the plate member reliably falls on the upper part of the immediately lower one of the groove-structure defining members. Accordingly, the granular material contacted and bounced on the plate member does not fall off to be broken.

In the above aspect of the invention, the deceleration unit is preferably a hopper-shaped member that receives the granular material dropped down from a lower part of the groove-structure defining members.

According to the above arrangement, the granular material received by the hopper-shaped member falls on the immediately lower one of the groove-structure defining members to flow diagonally downward in an opposite direction without being bounced and dropped. Accordingly, the granular material is kept from being broken due to an impact applied when the granular material falls off from the groove-structure defining member.

In the above aspect of the invention, the granular material is preferably a hydrogenated petroleum resin pellet.

With this arrangement, even brittle hydrogenated petroleum resin pellets can be favorably inhibited from being broken during storage. With this arrangement, for instance, when the hydrogenated petroleum resin pellets are mixed with a base polymer to prepare a hot-melt adhesive, complication of setting and adjusting production conditions of the hot-melt adhesive can also be prevented, in which the complication is caused when heating-mixing conditions are changed by a change of particle size distribution caused by breakage of the hydrogenated petroleum resin pellets.

BRIEF DESCRIPTION OF DRAWING(S)

Figure 11:
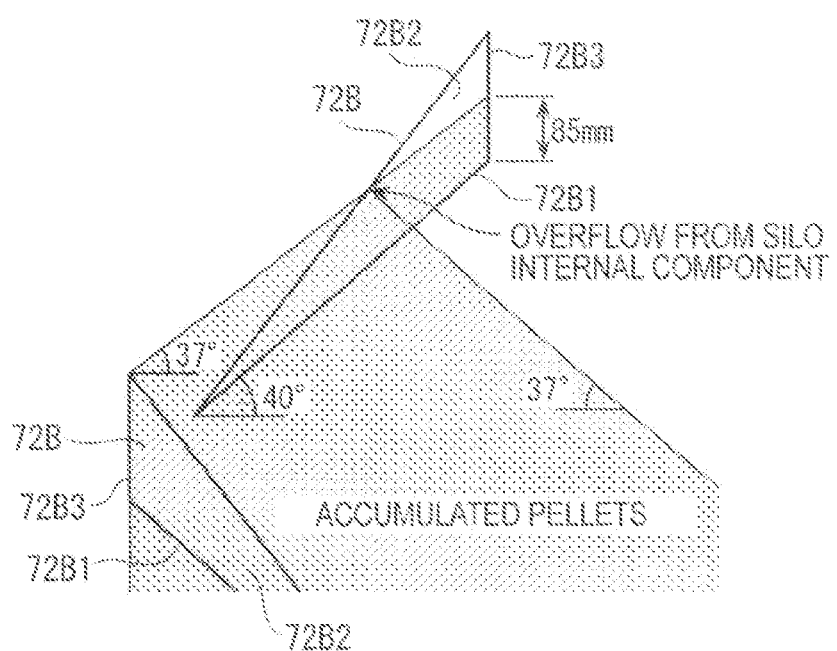

FIG. 11 schematically shows the hydrogenated petroleum resin pellets being stored after flowing on the groove inclined path.

Figure 12:
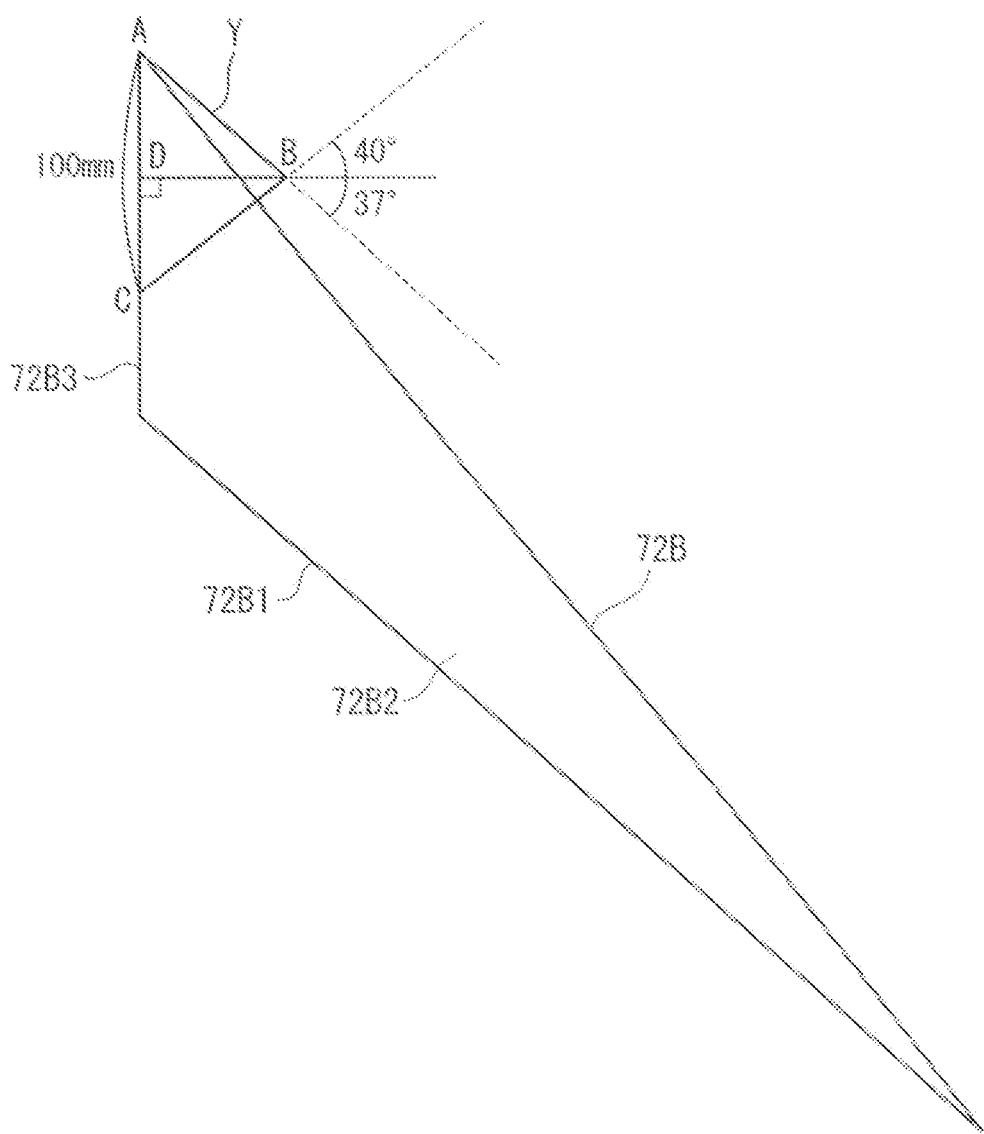

FIG. 12 illustrates an arrangement of the groove-inclined-path member.

Figure 13:
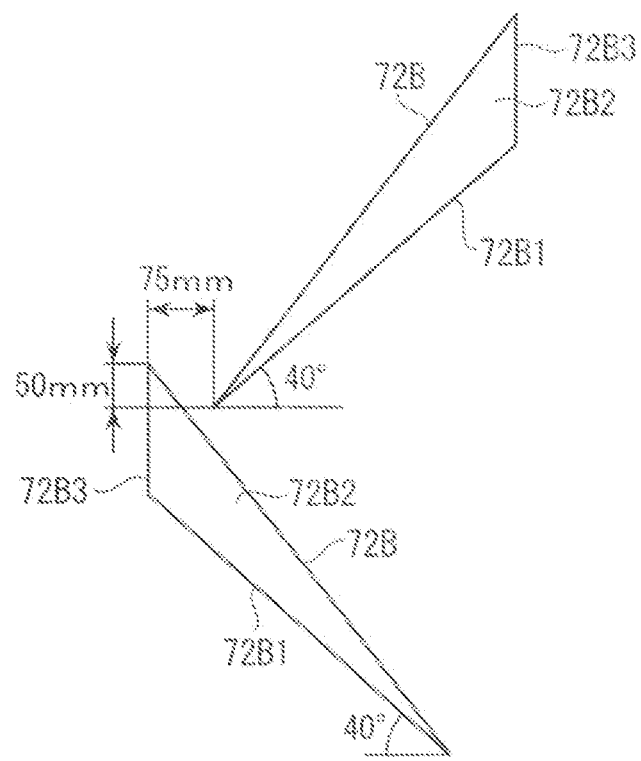

FIG. 13 illustrates a positional relationship of the groove-inclined-path members.

DESCRIPTION OF EMBODIMENT(S)

As a storage device of pelletized products of the invention, an exemplary embodiment related to a storage device of hydrogenated petroleum resin pellets will be described below with reference to the attached drawings.

The pelletized product in a form of hydrogenated petroleum resin pellets will be exemplified in the invention. However, the invention is also applicable to various granular materials and especially to granular materials easily broken due to impact applied thereon.

Initially, an arrangement of a production plant provided with the storage device of the hydrogenated petroleum resin pellets for producing the hydrogenated petroleum resin pellets will be described below.

Arrangement of Production Plant of Hydrogenated Petroleum Resin Pellets

Figure 1:
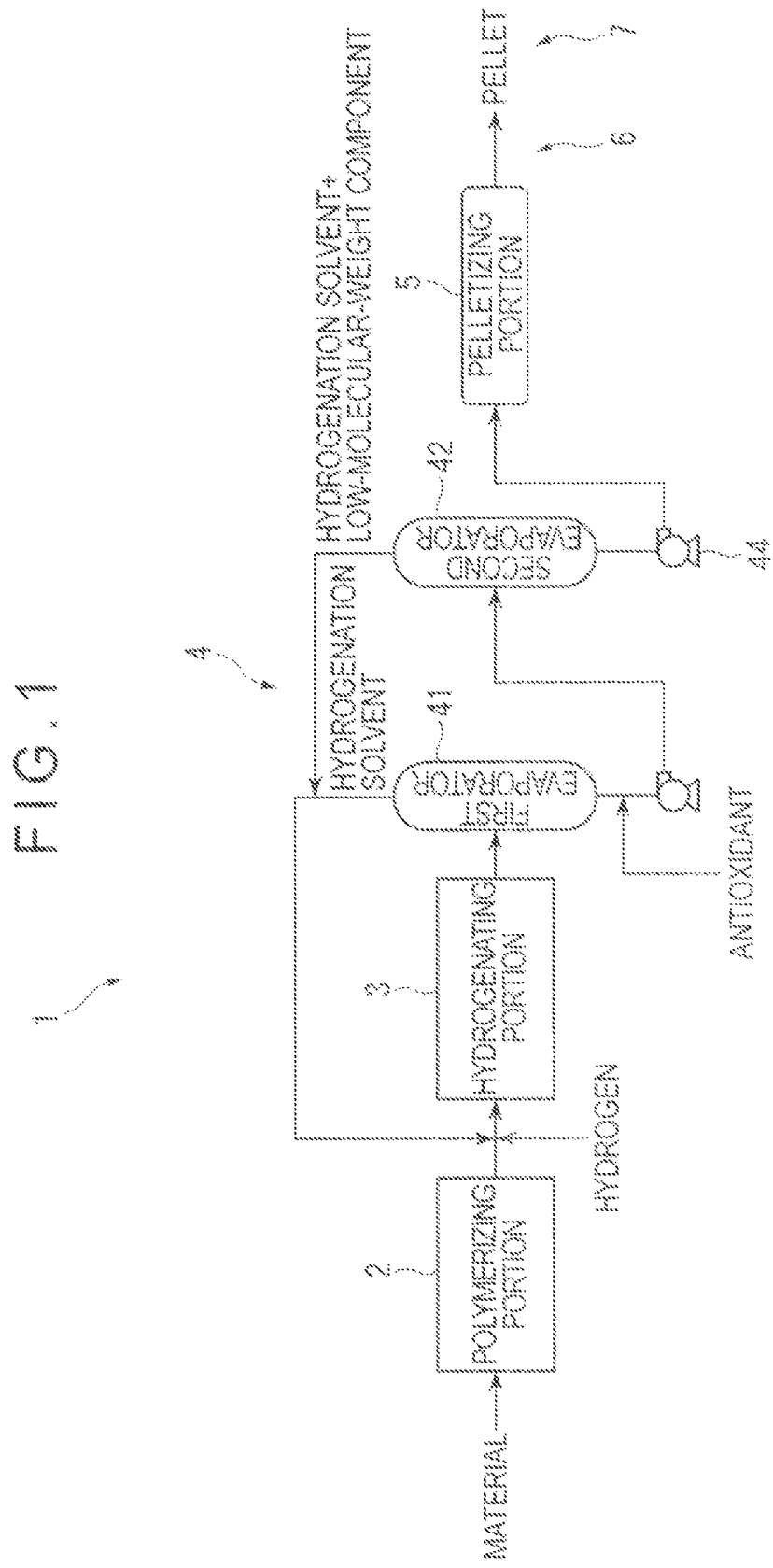
FIG. 1 is a block diagram schematically showing an arrangement of a production plant of hydrogenated petroleum resin pellets using a storage device of a granular material according to an exemplary embodiment of the invention.

As shown in FIG. 1, a production plant 1 for hydrogenated petroleum resin pellets is a plant for producing hydrogenated petroleum resin pellets from a hydrogenated petroleum resin material.

The production plant 1 includes: a polymerizing portion 2; a hydrogenating portion 3; a hydrogenation solvent recovering portion 4; a pelletizing portion 5; a transfer portion 6; a storage portion 7; and a control portion (not shown).

Polymerization Reaction

The polymerizing portion 2 performs a polymerization reaction in which a cyclopentadiene compound and a vinyl aromatic compound are thermally polymerized to produce a copolymer.

The polymerizing portion 2 is provided with, for instance, a polymerization reaction tank in which the hydrogenated petroleum resin materials in a form of the cyclopentadiene compound and the vinyl aromatic compound are thermally polymerized using a solvent.

Examples of the cyclopentadiene compound include cyclopentadiene, methylcyclopentadiene, ethylcyclopentadiene, dimmer thereof and co-dimers thereof.

Examples of the vinyl aromatic compound include styrene, a-methylstyrene and vinyl toluene.

Examples of the solvent include an aromatic solvent, naphthenic solvent and aliphatic hydrocarbon solvent. Specifically, benzene, toluene, xylene, cyclohexane, methylcyclohexane, dimethylcyclohexane and ethylcyclohexane are suitably usable. The solvent is recovered as necessary from the polymerization reaction tank to be recycled.

The recovered solvent typically contains a low-molecular-weight component with a molecular weight approximately in a range from 250 to 300.

In order to avoid degradation of the physical properties, the concentration of the low-molecular-weight component is at least set at 4 mass % or less when the solvent is recycled for the thermal polymerization. According to the content of the low-molecular-weight component in the recovered solvent, the low-molecular-weight component is further separately removed or the solvent is diluted with a new solvent so that the concentration of the low-molecular-weight component falls at 4 mass % or below before being used as the polymerization solvent at the start of the polymerization reaction.

The polymerization reaction tank is a reactor for performing the polymerization in a pressurized and heated environment. The polymerization reaction tank includes a stirrer and a heater (both not shown). A first material tank, a second material tank and a solvent tank of the solvent recovering portion are connected to the polymerization reaction tank, whereby the cyclopentadiene compound, the vinyl aromatic compound and the solvent are put into the polymerization reaction tank as needed. The obtained copolymer flows out through the bottom of the polymerization reaction tank to be subjected to the subsequent hydrogenation reaction.

Herein, though the mixture ratio of the cyclopentadiene compound and the vinyl aromatic compound is not particularly limited, a typical ratio (the cyclopentadiene compound: the vinyl aromatic compound) is in a range from 70:30 to 20:80.

Further, the used amount of the polymerization solvent is in a range from 50 to 500 parts by mass relative to 100 parts by mass of a mixture of the monomers.

At the start of the thermal polymerization, it is desirable that the temperature of the solvent is heated to 100 degrees C. or more, preferably 150 degrees C. or more in the polymerization reaction tank. The mixture of the cyclopentadiene compound and the vinyl aromatic compound is added in a divided manner into the heated solvent in the polymerization reaction tank for copolymerization.

The time for adding the mixture in a divided manner is typically in a range from 0.5 to 5 hours. It is desirable that the mixture is added in equal parts. The copolymerization reaction desirably continues after the addition of the mixture of the cyclopentadiene compound and the vinyl aromatic compound is completed. Though the reaction conditions at this time are not specifically limited, the typical reaction temperature is in a range from 150 to 350 degrees C., the typical reaction pressure is in a range from 0 to 2 MPa and the typical reaction time is in a range from 1 to 10 hours.

After the thermal polymerization in the polymerization reaction tank according to the above conditions, a copolymer having a softening point in a range from 60 to 130 degrees C., a content of the vinyl aromatic compound in a range from 30 to 90 mass %, a bromine number in a range from 30 to 90 g/100 g and a number average molecular weight in a range from 400 to 1000 is obtained.

Hydrogenation Reaction

In the hydrogenating portion 3, a hydrogenation reaction for adding hydrogen to the copolymer generated by the thermal polymerization in the polymerizing portion 2 to obtain a hydrogenated product is performed.

The hydrogenating portion 3 includes a plurality of hydrogenation reactors for performing the hydrogenation reaction for adding hydrogen to the copolymer generated by the thermal polymerization in the polymerizing portion 2 under the presence of the hydrogenation solvent, and the like.

Examples of the hydrogenation solvent are cyclohexane, methylcyclohexane, dimethylcyclohexane, ethylcyclohexane and tetrahydrofuran.

A hydrogenation catalyst is fed in each of the hydrogenation reactors. The hydrogenation reactors may be used in multiple stages. A nickel catalyst, palladium catalyst, cobalt catalyst, platinum catalyst, rhodium catalyst and the like are used for the hydrogenation catalyst. Under the presence of the hydrogenation catalyst, hydrogen and the copolymer are subjected to a hydrogenation reaction at a temperature in a range from 120 to 300 degrees C. and a reaction pressure in a range from 1 to 6 MPa and for a reaction time in a range from 1 to 7 hours.

A hydrogenated product having a softening point in a range from 70 to 140 degrees C., a content of the vinyl aromatic compound in a range from 0 to 35 mass %, a bromine number in a range from 0 to 30 g/100 g and a number average molecular weight in a range from 400 to 1000 is obtained according to the above hydrogenation conditions.

In the hydrogenating portion 3, gas phase component including unreacted hydrogen is separated to be recovered after the hydrogenation by the hydrogenation reactors and is subjected to a process outside the system.

Hydrogenation Solvent Removal

The hydrogenation solvent recovering portion 4 separates and removes the hydrogenation solvent from the hydrogenated product. The hydrogenation solvent recovering portion 4 includes a solvent evaporation tank 41 (first evaporator), a thin-film evaporator 42 (second evaporator) and the like.

The solvent evaporation tank 41 is connected to the hydrogenating portion 3. The solvent evaporation tank 41 separates and recovers the hydrogenation solvent by evaporation from the hydrogenated product obtained in the hydrogenating portion 3. The evaporated hydrogenation solvent is separately recovered and is recycled as the hydrogenation solvent used during the hydrogenation reaction in the hydrogenating portion 3.

The thin-film evaporator 42 is connected to the solvent evaporation tank 41. The thin-film evaporator 42 separates and recovers the hydrogenation solvent remained in the hydrogenated product by evaporation. The evaporated hydrogenation solvent and the low-molecular-weight component are separately recovered and are recycled as a hydrogenation solvent used during the hydrogenation reaction in the hydrogenating portion 3 according to the values of the physical properties of the hydrogenated petroleum resin pellets to be produced (target hydrogenated petroleum resin).

An adding portion for adding an antioxidant is provided between the solvent evaporation tank 41 and the thin-film evaporator 42 of the hydrogenation solvent recovering portion 4.

The adding portion of the antioxidant adds an antioxidant to the hydrogenated product from which most of the hydrogenation solvent is removed in the solvent evaporation tank 41.

The solvent in which the antioxidant is dissolved is to be separated and recovered together with the remaining hydrogenation solvent in the evaporation process by the downstream thin-film evaporator 42. The recovered hydrogenation solvent can be recycled for the hydrogenation reaction since the solvent in which the antioxidant is dissolved does not influence the hydrogenation reaction.

The solvent in which the antioxidant is dissolved is separated and recovered together with the hydrogenation solvent from the hydrogenated product by the downstream thin-film evaporator 42.

Pelletizing

The pelletizing portion 5 pelletizes the molten resin (i.e. the hydrogenated product from which the hydrogenation solvent is removed and to which the antioxidant is added) into hydrogenated petroleum resin pellets.

Figure 2:
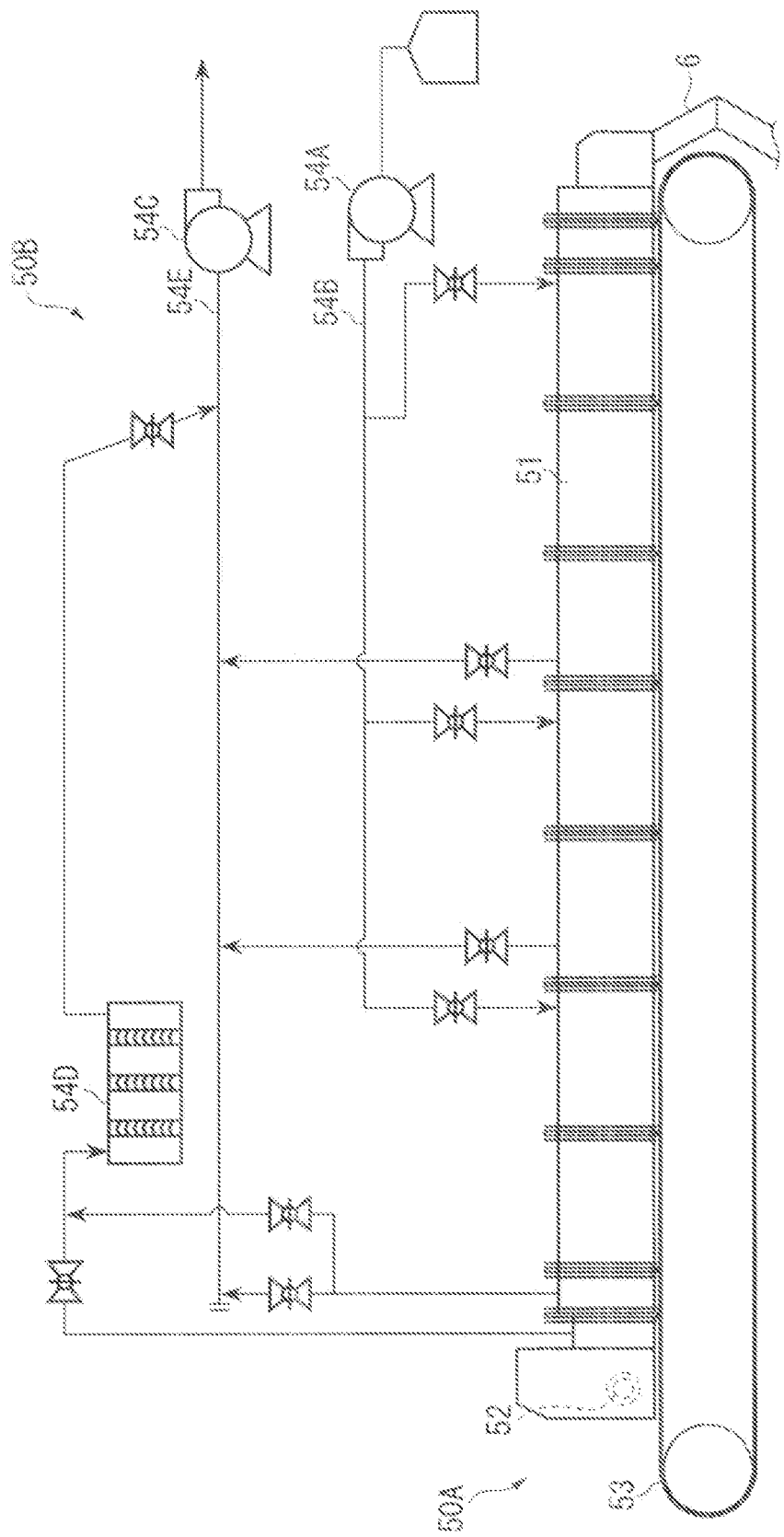
FIG. 2 is a diagram schematically showing an arrangement of a pelletizing portion in the production plant of the hydrogenated petroleum resin pellets.

Specifically, as shown in FIG. 2, the pelletizing portion 5 includes a pelletizer 50A and a pellet-air-cooling unit 50B.

Figure 3:
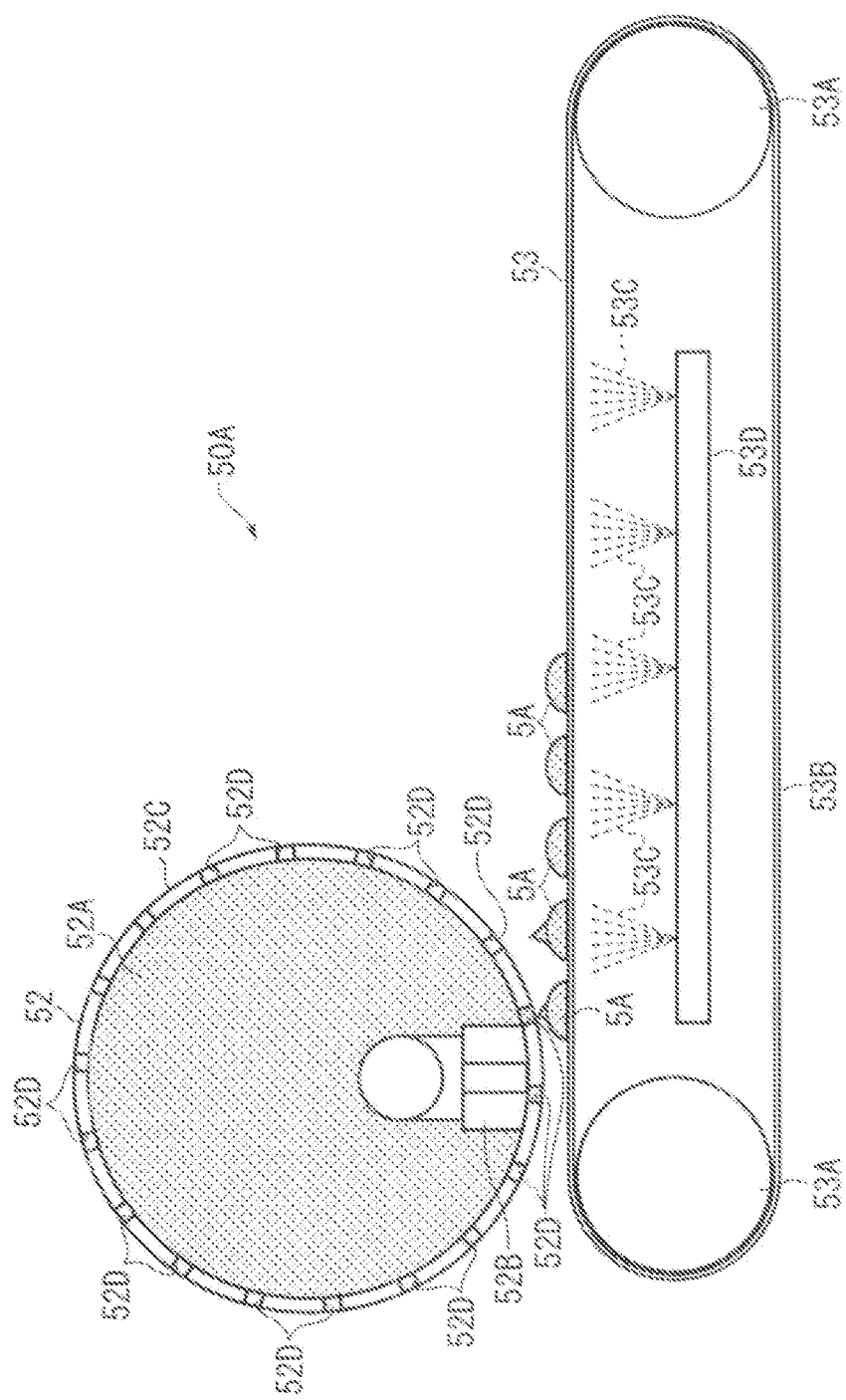
FIG. 3 is a diagram schematically showing an arrangement for explaining pelletization in the pelletizing portion.

As shown in FIG. 3, the pelletizer 50A includes a pelletizer body 52 and a cooling conveyor 53.

The pelletizer body 52 is disposed in a pelletizing case 51 in a manner to face an upstream end of the cooling conveyor 53 in a transfer direction. The pelletizer body 52 includes a trunk 52A having a cylindrical heating portion (not shown) and a die 52B that axially discharges a molten resin from an outer circumferential surface of the trunk 52A.

Further, the pelletizer body 52 includes a cylindrical rotary body 52C that is rotatably fitted to the outer circumferential surface of the trunk 52A. The rotary body 52C has a plurality of discharge holes 52D in a pattern of a perforated metal. When the outer circumferential surface of the trunk 52A is rotated to position the discharge holes 52D to the die 52B, a predetermined amount of the molten resin 5A is discharged on the cooling conveyor 53.

The cooling conveyor 53, which is disposed in the pelletizing case 51, includes a pair of pulleys 53A and a metallic belt 53B (a metallic endless belt) that is rotatably wound around the pulleys 53A.

Further, the cooling conveyor 53 includes a cooling portion 53D that ejects cooling water 53C toward a backside of the metallic belt 53B to cool the metallic belt 53B. It should be noted that a method for cooling the metallic belt 53B is not limited to ejecting the cooling water 53C, but any method (e.g. spraying of cool air) is applicable.

As shown in FIG. 2, the pellet-air-cooling portion 50B includes: an air intake 54B having an air-feeding blower 54A that introduces air to the pelletizing case 51; and an intake duct 54E having a filter 54D and an intake blower 54C that sucks air within the pelletizing case 51.

The air intake 54B is provided so as to introduce air into the pelletizing case 51 at positions corresponding to a downstream end and two middle positions of the cooling conveyor 53.

The intake duct 54E is provided so as to suck air in the pelletizing case 51 at positions corresponding to three positions near the pelletizer body 52 at the upstream end of the cooling conveyor 53 and two positions in the middle in the transfer direction of the cooling conveyor 53, in other words, in a range until the molten resin dropped on the cooling conveyor 53 is solidified. In the intake duct 54E, the filter 54D captures and remove low-molecular-weight component mist from air containing the low-molecular-weight component mist in the pelletizing case 51, so that only the air is exhausted.

Intake and exhaust of air in the middle positions are suitably designed according to different softening points of to-be-produced hydrogenated petroleum resin pellets. Specifically, a structure allowing intake and exhaust of air at a plurality of positions is preferable so as to cope with a case where the range until the molten resin is solidified differs depending on products.

As the filter 54D, an inertial collision filter, a blocking filter, an electrostatic adsorption filter, a Brownian diffusion filter and the like are used, among which a glass fiber filter is preferable. Specifically, since the low-molecular-weight component mist is formed of highly viscous microparticles having a mist diameter of 1 μm or less, the glass fiber filter that provides an effect to capture particles having an ignorable mass (i.e., capture effect by Brownian diffusion) in addition to the inertial collision effect is preferable A pressure loss of the filter 54D is preferably set in a range of 0.5 kPa to 2.5 kPa in view of a relationship with a filtration area.

Figure 4:
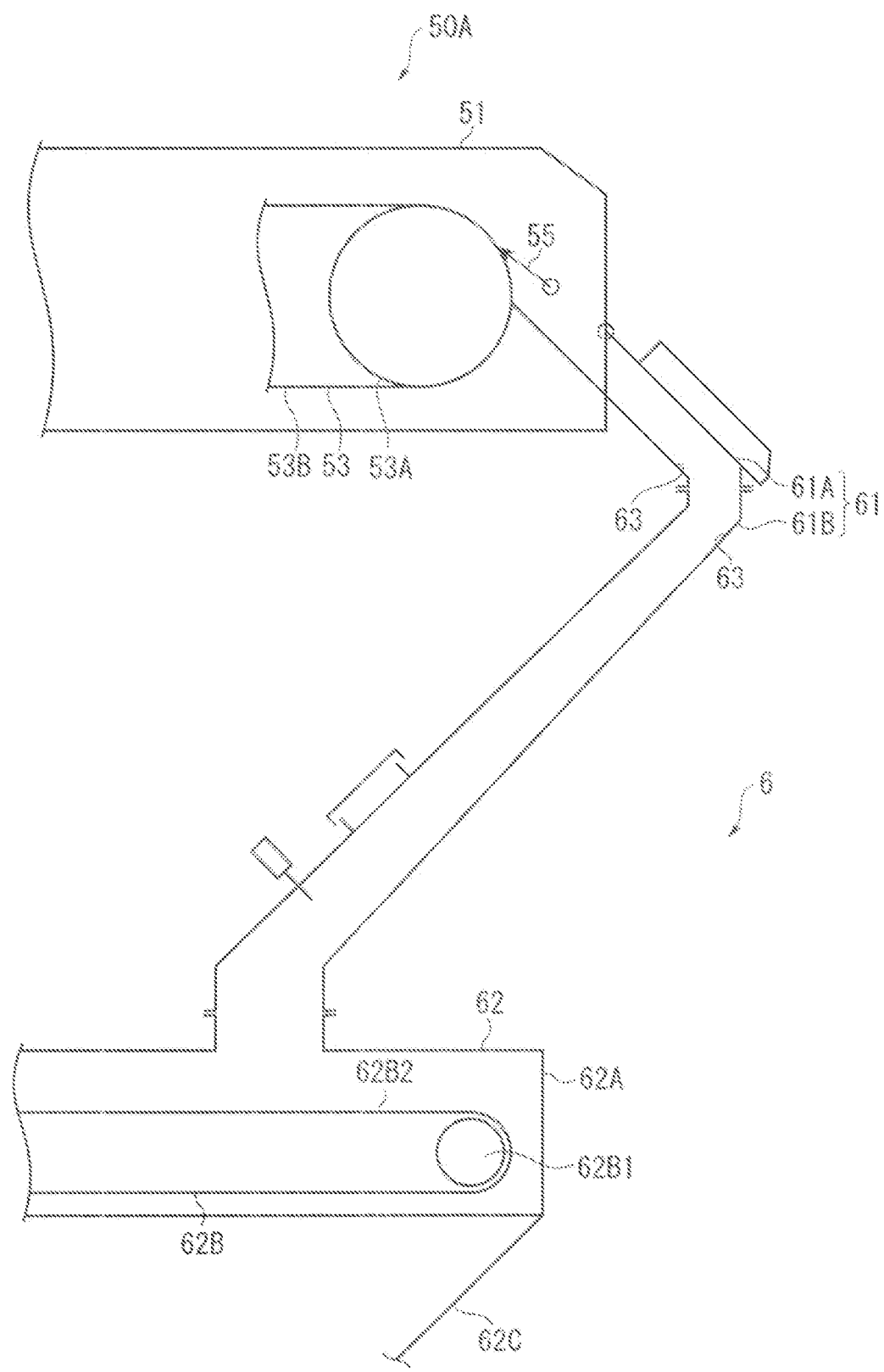
FIG. 4 is a diagram schematically showing an arrangement of a transfer portion in the production plant of the hydrogenated petroleum resin pellets.

As shown in FIG. 4, a scraper 55 that scrapes the hydrogenated petroleum resin pellets solidified on the metallic belt is disposed at the downstream end of the cooling conveyor 53 in the pelletizing case 51.

Further, a transfer portion 6 that is positioned at the downstream end of the cooling conveyor 53 and transfers the hydrogenated petroleum resin pellets to the storage portion 7 is connected to the pelletizing case 51.

Transfer

The transfer portion 6 transfers the hydrogenated petroleum resin pellets produced in the pelletizing portion 5 to the storage portion 7.

Figure 5:
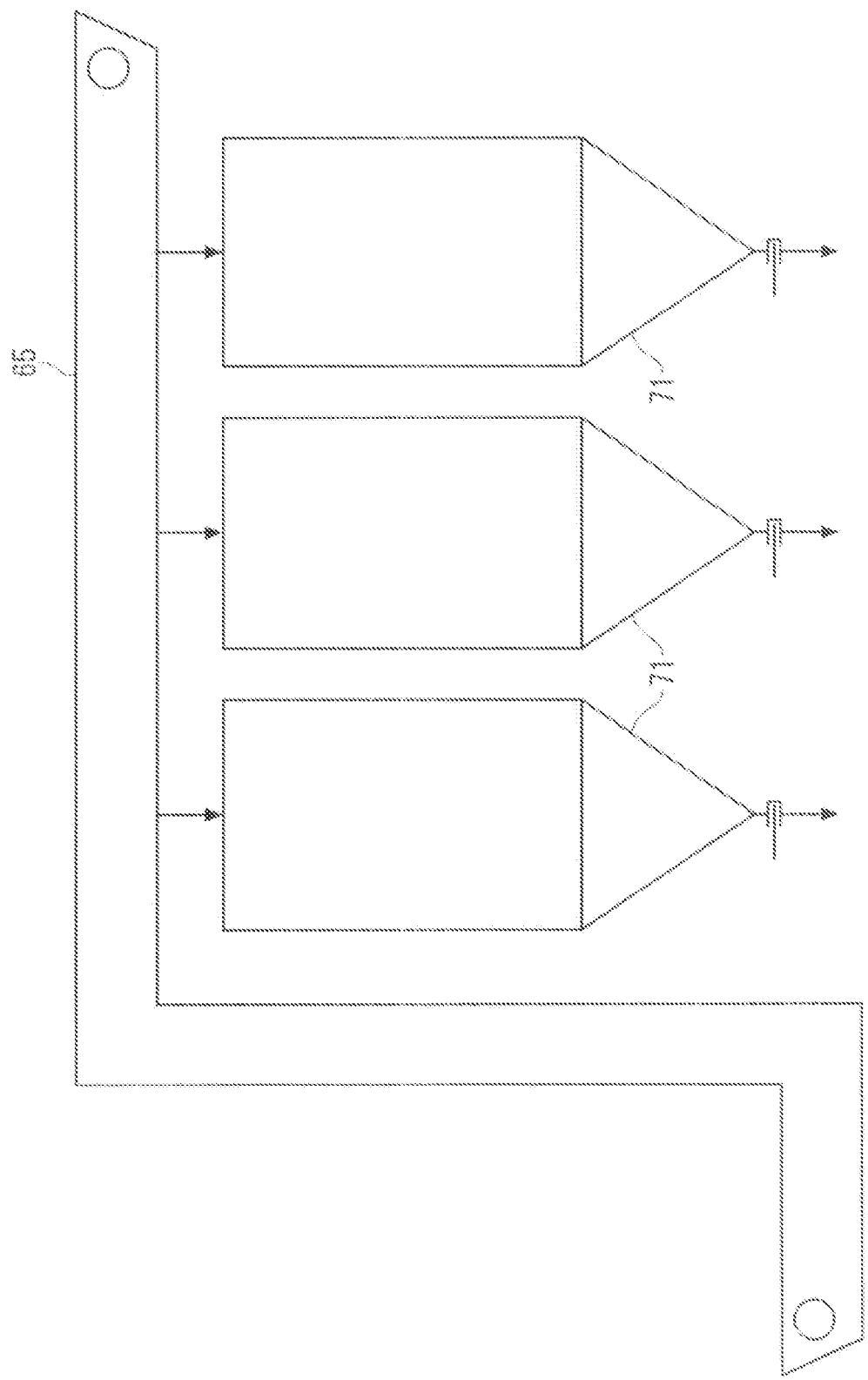
FIG. 5 is a diagram schematically showing an arrangement of a storage portion in the production plant of the hydrogenated petroleum resin pellets.

As shown in FIG. 4, the transfer portion 6 includes: a chute 61 connected to the pelletizing portion 5; a transfer conveyor 62 connected to the chute 61; and a bucket conveyor 65 (see FIG. 5).

The chute 61 includes: an upper chute 61A of which one end is connected to a lower part of the pelletizing case 51 at the downstream end of the cooling conveyor 53 and the other end extends downward; and a lower chute 61B of which one end is connected to a lower end of the upper chute 61A and the other end extends opposed to the upper chute 61A. The chute 61 is formed in a V-shape in a lateral view.

The upper chute 61A and the lower chute 61B are provided such that an inclined surface 63 on which the hydrogenated petroleum resin pellets flow is inclined at an inclination angle in a range of 44 degrees to 75 degrees relative to the horizontal surface.

Herein, when the inclination angle of the inclined surface 63 is less than 44 degrees, the hydrogenated petroleum resin pellets remain on the inclined surface 63. When the product to be produced is changed, the remaining hydrogenated petroleum resin pellets may be mixed with the newly produced product. On the other hand, when the inclination angle of the inclined surface 63 is sharp (i.e. more than 75 degrees), the flow speed of the hydrogenated petroleum resin pellets flowing on the inclined surface 63 is increased, which may break the hydrogenated petroleum resin pellets due to impact of the flow. Herein, the flow speed of the hydrogenated petroleum resin pellets is preferably less than 1.98 m/s.

The transfer conveyor 62 includes a conveyor case 62A, a belt conveyor 62B, and a collecting hopper 62C, as shown in FIG. 4.

The belt conveyor 62B is disposed in the conveyor case 62A to which the lower end of the lower chute 61B is connected and transfers the hydrogenated petroleum resin pellets having flowed through the lower chute 61B. The belt conveyor 62B includes a pair of transfer pulleys 62B1 and an endless belt 62B2 that is rotatably round around the transfer pulleys 62B1.

At the other end of the conveyor case 62A, a loading chute (not shown) for loading the hydrogenated petroleum resin pellets transferred by the belt conveyor 62B to the storage portion 7 is provided. A bucket conveyor that transfers the hydrogenated petroleum resin pellets to the storage portion 7 is connected to the loading chute.

The collecting hopper 62C is opened with a diameter thereof being enlarged upward and includes a plurality of collecting hoppers 62C provided to a lower surface of the conveyor case 62A under the belt conveyor 62B. An inner surface of the collecting hopper 62C is formed to be inclined at an angle larger than the repose angle at which the powdery hydrogenated petroleum resin pellets slip down, specifically at the angle of 70 degrees or more relative to the horizontal surface. The plurality of collecting hoppers 62C are not necessarily provided. Only a single collecting hopper 62C may be provided as long as the collecting hopper 62C is provided under the lower chute 61B and can collect the hydrogenated petroleum resin pellets dropped off from the belt conveyor 62B after flowing through the lower chute 61B.

A screw conveyor (not shown) is provided to a lower portion of each of the plurality of collecting hoppers 62C. The screw conveyor is adapted to transfer the hydrogenated petroleum resin pellets and powder thereof which are collected by each of the collecting hoppers 62C to the outside of the collecting hoppers 62C. The screw conveyor is provided to the lower portion of the collecting hopper 62C in this exemplary embodiment. However, a belt conveyor or a simply openable/closable exhaust opening may alternatively be provided thereto.

Storage

The storage portion 7 stores the hydrogenated petroleum resin pellets transferred by the transfer portion 6 in a manner so that the pellets are capable of being taken out.

As shown in FIG. 5, the storage portion 7 includes a plurality of storage hoppers 71 and a switching portion (not shown) for loading the hydrogenated petroleum resin pellets transferred by the bucket conveyor 65 of the transfer portion 6 to a predetermined one of the storage hoppers 71.

Each of the storage hoppers 71 has a cylindrical inner circumference and a bottom portion of which diameter decreases toward a lower side in a vertical direction. A pair of loading ports (not shown) through which the hydrogenated petroleum resin pellets dropped from the switching portion are loaded are provided near a periphery of an upper part of the storage hopper 71 in a diameter direction thereof. A discharge port for discharging the stored hydrogenated petroleum resin pellets is provided to a lower end of the storage hopper 71. The discharge port is opened and closed by a discharge valve (not shown).

A groove inclined path 72 (a path shown in FIGS. 6 to 8) is provided in the storage hopper 71, the groove inclined path 72 being provided in a pair in the diameter direction of the storage hopper 71.

The storage hopper 71 is not necessarily cylindrical but may be designed in any manner (e.g. in a square column).

The groove inclined path 72 delivers the hydrogenated petroleum resin pellets loaded through the loading port of the storage hopper 71 diagonally downward while inhibiting breakage of the hydrogenated petroleum resin pellets. The groove inclined path 72 includes: a support member (not shown) provided on the inner circumference of the storage hopper 71 in a manner extending from the loading port to the bottom of the storage hopper 71; and a plurality of groove-inclined-path members 72B vertically provided on the support member.

Figure 6:
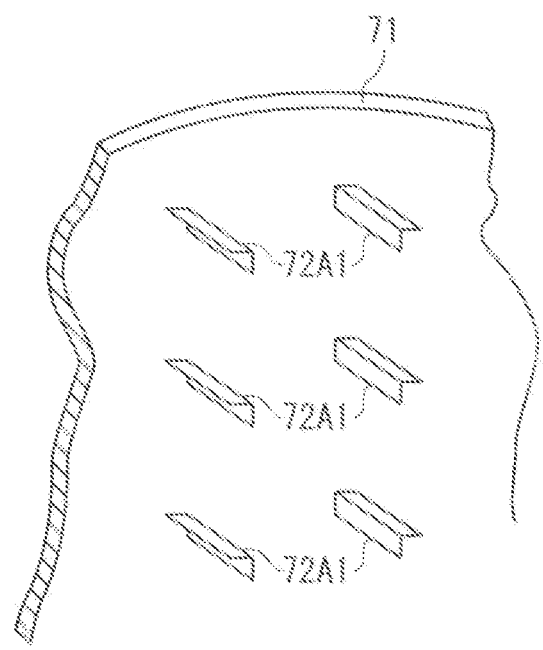
FIG. 6 is a partially cut perspective view showing a storage hopper of the storage portion.
Figure 7:
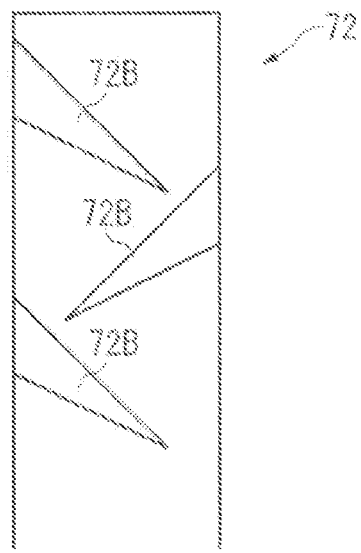
FIG. 7 is a front elevation showing a groove inclined path of the storage portion.
Figure 8:
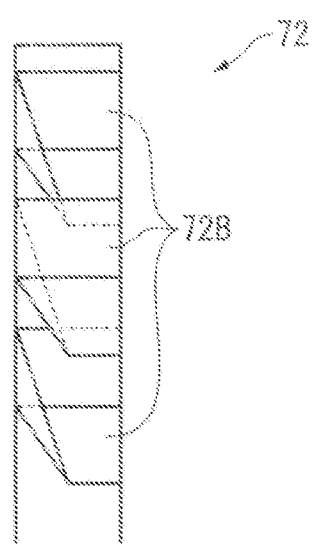
FIG. 8 is a side elevation showing the groove inclined path.
Figure 9:
FIG. 9 is a plan view showing the groove inclined path.

The support member includes attachment fittings 72A1 as shown in FIG. 6. Each of the attachment fittings 72A1 is a steel plate member that is bent into an L-shaped cross section. The plurality of attachment fittings 72A1 project from the inner circumference of the storage hopper 71 at a predetermined interval. Vertically adjacent ones of the groove-inclined-path members 72B are oppositely attached to the support member such that the flow direction of the hydrogenated petroleum resin pellets is reversed by the adjacent ones of the groove-inclined-path members 72B as shown in FIGS. 7 to 9.

Figure 10:
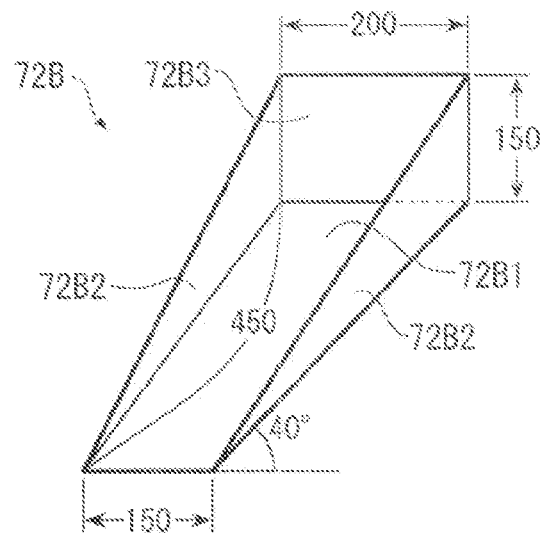
FIG. 10 is a perspective view showing a groove-inclined-path member defining the groove inclined path.

As shown in FIG. 10, each of the groove-inclined-path members 72B is a member made of for instance, stainless steel and defines a groove structure for delivering the hydrogenated petroleum resin pellets diagonally downward.

Each of the groove-inclined-path members 72B includes: an inclined plate 72B1 that is inclined at an angle greater than a repose angle (37 degrees) at which the hydrogenated petroleum resin pellets fall down; side plates 72B2 provided by upwardly bending both sides of the inclined plate 72B1; and a plate member 72B3 (deceleration unit) provided by upwardly bending a first (upper) end of the inclined plate 72B1, thereby defining a groove structure.

It should be noted that the groove-inclined-path member 72B is not necessarily provided by a steel plate but may alternatively be provided by various materials such as a surface-treated steel plate.

The inclined plate 72B1 is a trapezoidal member of which width becomes narrower from the first end toward a second end. Specifically, the width of the inclined plate 72B1 is narrowed toward the lower (second) end so that the hydrogenated petroleum resin pellets falling from the lower end of the inclined plate 72B1 are reliably brought into contact with the plate member 72B3 of an immediately lower one of the groove-inclined-path members 72B.

Especially, the width of the inclined plate 72B1 is preferably set in accordance with a production amount Q of the hydrogenated petroleum resin pellets in the pelletizing portion 5. Specifically, supposing that the production amount is Q, the bulk density of the hydrogenated petroleum resin pellets is 620 kg/m$^3$, a cross sectional area in which the produced hydrogenated petroleum resin pellets are circulated is S and a width of the inclined plate 72B1 is D, a height H of the mass of hydrogenated petroleum resin pellets flowing down at the lower end of the inclined plate 72B1 can be calculated according to the following formula (1). The height H is preferably set such that the flowing hydrogenated petroleum resin pellets are not layered but the flowing hydrogenated petroleum resin pellets flow down in a single layer in order for the hydrogenated petroleum resin pellets not to contact with each other to inhibit the flow thereof. Thus, the width of the inclined plate 72B1 can be set.

Formula 1

$$H = S/D \quad (1)$$

S: Q/v v: flow speed of the hydrogenated petroleum resin pellets

Each of the side plates 72B2 is formed so that the height of each of the side plates 72B2 is reduced from the first end toward the second end of the inclined plate 72B1. Specifically, when the hydrogenated petroleum resin pellets are loaded into the storage hopper 71 to increase the amount of the hydrogenated petroleum resin pellets stored in the storage hopper 71, the hydrogenated petroleum resin pellets overflow from the side plates 72B2 of the groove-inclined-path member 72B as shown in FIG. 10.

Thus, it is preferable that the height of the side plates 72B2 near the plate member 72B3 with which the dropped hydrogenated petroleum resin pellets contact is set high enough for the dropped hydrogenated petroleum resin pellets not to bounce back to overflow from the side plates 72B2, while the height of the side plates 72B2 at the lower end is set low enough for the hydrogenated petroleum resin pellets to easily overflow. Accordingly, triangular configuration of the side plates 72B2 is preferable, which is also preferable in terms of productivity.

The hydrogenated petroleum resin pellets falling down from a lower part of above-disposed one of the groove-inclined-path members 72B contact with the plate member 72B3, whereby the flow direction of the hydrogenated petroleum resin pellets is reversed and the flow speed of the hydrogenated petroleum resin pellets is reduced. Since the fall speed of the hydrogenated petroleum resin pellets loaded into the storage hopper 71 is equal to the speed of the hydrogenated petroleum resin pellets vertically dropped from a 200 mm height, when the height of the plate member 72B3 is 200 mm (i.e. a height of the same position energy), the dropped hydrogenated petroleum resin pellets can be securely brought into contact with the plate member 72B3. Incidentally, the height of the plate member 72B3 is defined to be 150 mm in this exemplary embodiment as shown in FIG. 9.

A surface of the plate member 72B3 facing the inclined plate 72B1 is angled at or more than [180 degrees-(repose angle of the hydrogenated petroleum resin pellets)] relative to the inclined plate 72B1. Specifically, when each of the groove-inclined-path members 72B is disposed to the inner circumference of the storage hopper 71 via the support member, the inclined plate 72B1 is angled at or more than the repose angle relative to the horizontal surface and a plane of the plate member 72B3 is vertically oriented.

More specifically, the inclination angle of each of the groove-inclined-path members 72B is defined in a range from 37 to 45 degrees, preferably at 40 degrees and the distance between the plate member 72B3 and another plate member 72B3 of the immediately lower one of the groove-inclined-path members 72B comes in a range from 405 mm to 500 mm, preferably 450 mm so that the fall speed of the hydrogenated petroleum resin pellets when the hydrogenated petroleum resin pellets falls on the inclined plate 72B1 to contact with the plate member 72133 of the immediately lower one of the groove-inclined-path members 72B becomes lower than 1.98 m/s.

In addition, as shown in FIGS. 6 to 8, each of the plurality of groove-inclined-path members 72B is disposed so that an inclination direction of the inclined plate 72B1 of each of the plurality of groove-inclined-path members 72B is opposite (reverse) to the inclination direction of immediately above one of the groove-inclined-path members 72B and the hydrogenated petroleum resin pellets dropped from the immediately above one of the groove-inclined-path members 72B are brought into contact with the plate member 72B3. Specifically, each of the plurality of groove-inclined-path members 72B is disposed to satisfy the following three conditions.

1. In order to secure a flow path when the lower one of the groove-inclined-path members 72B is buried in the hydrogenated petroleum resin pellets, the lower end of the immediately above one of the groove-inclined-path members 72B is located above the side plates 72B2, so that the groove-inclined-path members 72B are not overlapped in a side elevation. Specifically, when a line of repose angle (37 degrees) is drawn from an upper edge of the plate member 72B3 as shown in FIG. 12, the lower end of the immediately above one of the groove-inclined-path members 72B is located so as not to approach the lower one of the groove-inclined-path members 72B beyond the line of the repose angle.

2. In order to reliably drop the hydrogenated petroleum resin pellets on the inclined plate 72B1 of each of the groove-inclined-path members 72B, the immediately above one of the groove-inclined-path members 72B is located so that the hydrogenated petroleum resin pellets dropped from the immediately above one of the groove-inclined-path members 72B are brought into contact with a point at one third of the height of the plate member 72B3 from the lower end of the plate member 72B3 (i.e. 50 mm above the lower end).

Accordingly, as shown in FIG. 13, when the lower end of the immediately above one of the groove-inclined-path members 72B is located at a vertex B of a triangle area Y shown in FIG. 12, the groove-inclined-path members 72B are mutually located closest. Thus, each of the plurality of groove-inclined-path members 72B is preferably disposed as shown in FIG. 13.

It should be noted that an uppermost one of the groove-inclined-path members 72B in the groove inclined path 72 is not necessarily provided with the plate member 72B3.

Advantage(s) of Embodiment(s)

As described above, when the hydrogenated petroleum resin pellets loaded through the loading port of the storage hopper 71 flow diagonally downward on the groove inclined path 72, the flow direction of the hydrogenated petroleum resin pellets is reversed and the flow speed of the hydrogenated petroleum resin pellets is reduced by the plate member 72B3 of the groove-inclined-path member 72B.

Accordingly, the impact applied when the hydrogenated petroleum resin pellets loaded through the loading port are dropped downward is reduced, so that the breakage of the hydrogenated petroleum resin pellets can be avoided.

Further, in the above exemplary embodiment, the hydrogenated petroleum resin pellets flow diagonally downward with the use of the simply structured groove-inclined-path members 72B. In addition, the groove inclined path 72 is defined by the groove-inclined-path members 72B with a groove structure that, when the loaded hydrogenated petroleum resin pellets are gradually accumulated to be piled up to reach one of the groove-inclined-path members 72B, allows the hydrogenated petroleum resin pellets to overflow the groove-inclined-path member 72B to go around toward the lower side of the groove-inclined-path member 72B as shown in FIG. 10.

Accordingly, the hydrogenated petroleum resin pellets are kept from being clogged on the way and a dead space (i.e. a space in which the pellets cannot be stored) is not generated, thereby achieving efficient storing of the pellets.

In the exemplary embodiment, the groove inclined path 72 is provided by the vertically arranged plurality of groove-inclined-path members 72B in which each of the plate members 72B3 is disposed in order to reverse the flow direction of the hydrogenated petroleum resin pellets.

According to the above arrangement, while the hydrogenated petroleum resin pellets flow diagonally downward on the groove-inclined-path members 72B, the flow direction of the hydrogenated petroleum resin pellets is reversed by the contact with each of the plate members 72B3. The hydrogenated petroleum resin pellets of which flow speed is reduced by the reverse movement flow diagonally downward in an opposite direction on the immediately lower one of the groove-inclined-path members 72B. Accordingly, the impact applied when the hydrogenated petroleum resin pellets are dropped can be restrained with a simple structure and the hydrogenated petroleum resin pellets can be stored without breakage.

Further, in the above exemplary embodiment, the hydrogenated petroleum resin pellets flowing diagonally downward on the groove-inclined-path members 72B are contacted and bounced by the simply-structured plate member 72B3 to reverse the flow direction of the hydrogenated petroleum resin pellets.

Thus, the flow speed of the hydrogenated petroleum resin pellets can be reduced by contacting and bouncing the hydrogenated petroleum resin pellets on the simply-structured plate member 72B3 to reverse the flow direction, so that the breakage on the hydrogenated petroleum resin pellets can be restrained with the simple structure.

In addition, since the groove width of each of the groove-inclined-path members 72B is defined so that the width of the upper part of the groove-inclined-path member 72B is wider than the width of the lower part thereof, the hydrogenated petroleum resin pellets dropped from the lower part of the groove-inclined-path member 72B to contact the plate member 72B3 securely fall on the upper part of the immediately lower one of the groove-inclined-path members 72B without dropping off.

Accordingly, the hydrogenated petroleum resin pellets contacted and bounced on the plate member 72B3 are kept from dropping off to be broken.

In the exemplary embodiment, the above arrangement is used for favorably storing brittle hydrogenated petroleum resin pellets while preventing breakage of the hydrogenated petroleum resin pellets.

With this arrangement, for instance, when the hydrogenated petroleum resin pellets are mixed with a base polymer to prepare a hot-melt adhesive, complication of setting and adjusting production conditions of the hot-melt adhesive can also be prevented, in which the complication is caused when heating-mixing conditions are changed by a change of particle size distribution caused by breakage of the hydrogenated petroleum resin pellets.

Modification(s)

Incidentally, it should be understood that the scope of the present invention is not limited to the above-described exemplary embodiment(s) but includes modifications and improvements as long as the modifications and improvements are compatible with the invention.

Specifically, the brittle hydrogenated petroleum resin pellets are exemplarily stored, but various kinds of granular materials that may be broken by receiving impact when being dropped for storing are usable.

Though each of the groove-inclined-path members 72B is provided in a form of a chute of a U-shaped cross section having the inclined plate 72B1 and the side plates 72B2, such a configuration is not exhaustive.

For instance, the inclined plate 72B1 may have any kind of groove configuration (e.g. curving the inclined plate 72B1 or bending the inclined plate 72B1 at the center to provide a member of a V-shaped cross-section) as long as the hydrogenated petroleum resin pellets are capable of flowing diagonally downward.

Though the plate member 72B3 is used for reducing the speed of the hydrogenated petroleum resin pellets, such arrangement is not exhaustive.

For instance, a hopper-shaped member for temporarily storing the hydrogenated petroleum resin pellets may be used instead of the plate member 72B3. According to the above arrangement, the hydrogenated petroleum resin pellets dropped from each of the groove-inclined-path members 72B and received by the hopper-shaped member are dropped to the lower one of the groove-inclined-path members 72B to flow diagonally downward in an opposite direction without being bounced and dropped.

Accordingly, even with the use of the hopper-shaped member, the breakage on the hydrogenated petroleum resin pellets due to the impact applied when the hydrogenated petroleum resin pellets are dropped from the groove-inclined-path members 72B can be avoided.

It should be noted that the hopper-shaped member may be configured in any manner as long as the hydrogenated petroleum resin pellets can be dropped on the lower one of the groove-inclined-path members 72B after reducing the speed of the hydrogenated petroleum resin pellets. For instance, the hopper-shaped member may be designed so that (1) the dropped hydrogenated petroleum resin pellets are brought into contact with an inner circumference of the hopper-shaped member before the hydrogenated petroleum resin pellets are dropped to the lower one of the groove-inclined-path members 72B, (2) the hydrogenated petroleum resin pellets are temporarily received in the hopper-shaped member in a sand-clock fashion before the hydrogenated petroleum resin pellets drop to the lower one of the groove-inclined-path members 72B, or (3) the hydrogenated petroleum resin pellets are temporarily received by the hopper-shaped member and the dropped hydrogenated petroleum resin pellets overflow the hopper-shaped member to fall on the lower one of the groove-inclined-path members 72B.

Further, any component capable of reducing the speed of the hydrogenated petroleum resin pellets may be used instead of the plate member 72B3 and the hopper-shaped member.

Other specific structure and process in implementing the invention may be altered otherwise as long as the structure and the process are compatible with the invention.

The invention claimed is:

1. A storage device that stores a hydrogenated petroleum resin pellet that is adapted to be loaded from an upper part of the storage device and to be discharged from a lower part of the storage device, the storage device comprising:
   a flow path adapted to diagonally downwardly deliver the hydrogenated petroleum resin pellet loaded through the upper part; and
   a plurality of groove members each coupled to the flow path and defining a groove-structure for restraining a breakage on the hydrogenated petroleum resin pellet, the plurality of groove members arranged vertically relative to one another along the flow path such that vertically adjacent ones of the groove members are inclined in mutually opposite directions wherein each of the groove members comprises a plate member adapted to contact with the hydrogenated petroleum resin pellet flowing down from a lower part of an upper one of the adjacent ones of the groove members and reverse a direction of the hydrogenated petroleum resin pellet in the flow path, to reduce a flow speed of the hydrogenated petroleum resin pellet,
   wherein an inclination angle of each of the groove members is in a range from 37 to 45 degrees and a distance between the plate member of the upper one of the adjacent ones of the groove members and the plate member of a lower one of the adjacent one of the groove members is in a range from 405 mm to 500 mm.

2. The storage device claim 1, wherein
   the plate member is a deceleration unit disposed in a course provided by the vertically adjacent ones of the groove members.

3. The storage device claim 2, wherein
   the deceleration unit is a plate member adapted to contact the granular material dropped down from a lower part of the upper one of the adjacent ones of the groove members.

4. The storage device of claim 3, wherein
   a groove width of each of the groove members is wider at an upper part of each of the groove members than at the lower part of each of the groove members.

5. The storage device of claim 2, wherein
   the deceleration unit is a plate member comprising an upper part and a lower part, the upper part having a width greater than the lower part and is adapted to receive the hydrogenated petroleum resin pellet dropped down from a lower part of the upper one of the adjacent ones of the groove members.

6. A process for storing a hydrogenated petroleum resin pellet, the process comprising:
    loading the hydrogenated petroleum resin pellet in the upper part of the storage device of claim 1;
    making the hydrogenated petroleum resin pellet flow along the flow path; and
    reversing a direction of the hydrogenated petroleum resin pellet in the flow path with the plate member, to reduce the flow speed of the hydrogenated petroleum resin pellet.

* * * * *